Oct. 15, 1968       F. B. VAZQUEZ       3,405,429
FASTENING AND LOCKING DEVICE
Filed June 16, 1967
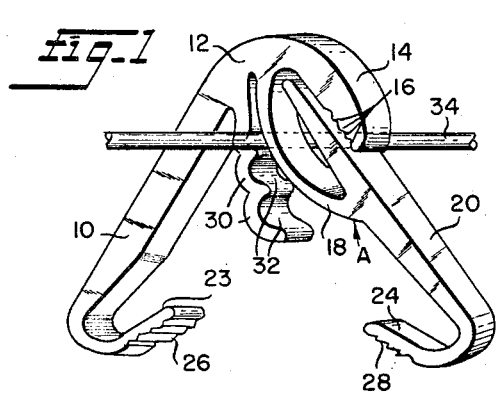
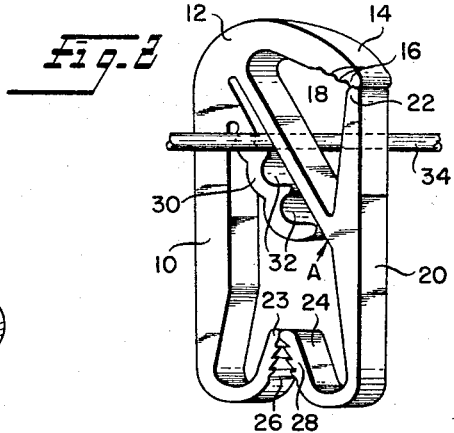
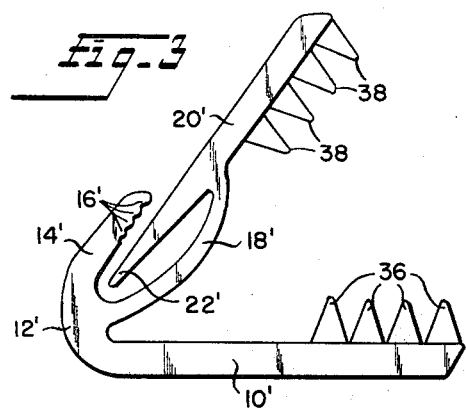
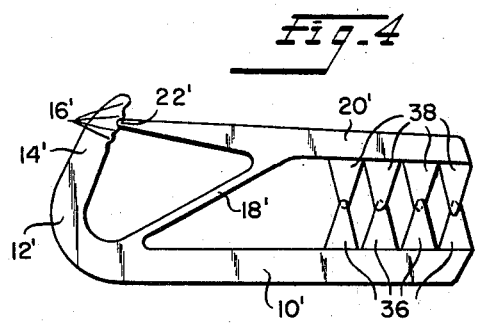
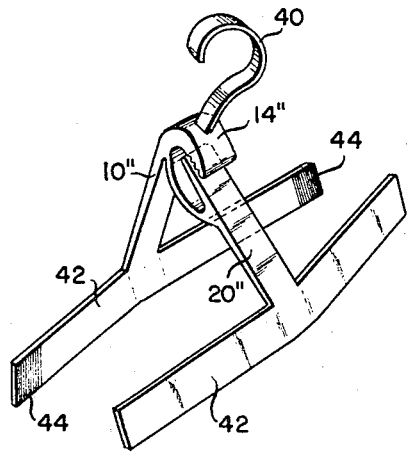
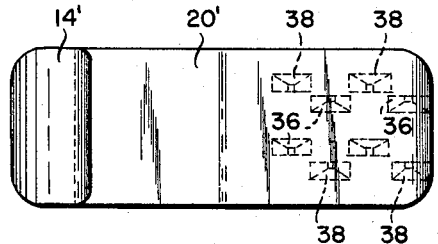
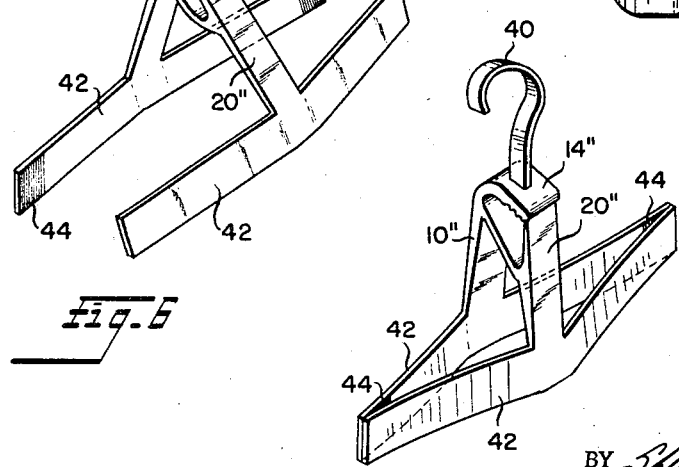
INVENTOR
Francisco B. Vazquez
BY *Schwinger, Arkwright & Garvey*
ATTORNEYS

United States Patent Office 3,405,429
Patented Oct. 15, 1968

3,405,429
FASTENING AND LOCKING DEVICE
Francisco B. Vazquez, 7815 Lewinsville Road,
McLean, Va. 22101
Filed June 16, 1967, Ser. No. 646,554
15 Claims. (Cl. 24—137)

ABSTRACT OF THE DISCLOSURE

A fastening and locking device including a base member, one terminal of the base member being disposed at an angle to the main body portion of the base member and having locking notches in one face thereof, a locking member, one end of which is adapted for selective engagement with the notches of the base member, a combination spring and pivot connecting member to permit relative movement therebetween and jaws extending from the free terminals of the base and locking member, the jaws being urged against an object interposed therebetween to retain the same when the locking member is engaged in one of the base member notches.

---

This invention relates to a fastening and locking device and constitutes an improvement of the fastener assembly of my previously granted Patent Number 3,246,376.

Objects and description of figures of drawing

It is an object of this invention to provide a fastening and locking device of simplified construction embodying interconnected members having gripping means at one end for retaining an object interposed therebetween, and complemental locking portion at the opposite end of the interconnected members for preventing accidental disengagement of said gripping means from the object being held.

Another object is to provide a fastening and locking device which may be of molded one-piece construction including a base member and a locking member joined by a combination spring-and-hinge connecting member.

A further object is to provide a fastening and locking device of the character described including means for selectively and positively locking the members together in various positions without danger of accidental opening, the members being readily locked and unlocked as desired, with one hand.

Other objects will be manifest from the following description of the presently preferred forms of the present invention, taken in connection with the appended drawing wherein:

FIGURE 1 is a perspective view of a fastening and locking device, made in accordance with the present invention, the device being shown in open position;

FIGURE 2 is a view similar to FIGURE 1, showing the device in closed or locked position;

FIGURE 3 is a side elevational view of a modified form of the present invention, showing the device in open position;

FIGURE 4 is a side elevational view of the device in FIGURE 3, showing the same in closed or locked position;

FIGURE 5 is a top plan view of the form of the invention illustrated in FIGURES 3 and 4, with the device in closed or locked position;

FIGURE 6 is a perspective view of another modified form of the present invention, showing the device in open position; and FIGURE 7 is a perspective view of the form of invention illustrated in FIGURE 6, showing the same in closed or locked position.

Referring now in greater detail to the drawing, there is illustrated in FIGURES 1 and 2 the device of the present invention as applied to a hanger clip, the device being preferably of one-piece molded construction, made of a suitable plastic material having flexing properties, such as polypropylene or an acetal resin.

The device of this form of the invention includes a base member 10 of substantially rectilinear conformation, one terminal of which is bent at 12 to form an angularly disposed locking element 14, extending at an angle with respect to the base member. The internal face of locking element 14 is flattened and provided with a series of transverse notches 16 near the extemity of the locking element, for purposes which will be hereinafter more fully set out.

At a point proximate bent terminal 12, there is provided a combination spring and pivot connecting member 18 which is preferably of bowed or arcuate shape. This combination spring and pivot connecting member extends from the internal face of bent portion 12 to the internal face of a locking member 20 at a point intermediate the latter's length. It will be noted from a consideration of FIGURE 1, that when the assembly of the present invention is in the open position, the terminal of locking member 20 is disengaged from notches 16 of locking element 14. When in the locked position shown in FIGURE 2, however, the extreme terminal 22 of locking member 20 is selectively engaged with one of the transverse notches 16, to effect locking of the assembly.

The free terminals of base member 10 and locking member 20 are bent inwardly towards each other to form gripping members designated 23 and 24 respectively, the opposed faces of which members are provided with serrations 26 and 28 to effect a better purchase on any materials therebetween. The angular disposition of gripping members 23 and 24 serves to increase the gripping engagement of these members with the object held.

It is further within the contemplation of this form of the present invention to provide a hanger or line engaging member 30 which extends inwardly of the assembly and depends from bent portion 12 proximate spring and pivot connecting member 18. Member 30 is provided with a plurality of transverse arcuate recesses 32 of different sizes adapted for selective engagement with the supporting member 34 of a hanger or like article.

Operation

In use of the assembly of FIGURES 1 and 2, the device is placed over the supporting member 34 of the hanger, or clothesline, in the manner illustrated in FIGURE 1, the particular recess engaged by the supporting member depending upon the diameter of the latter. Pressure is then exerted on base member 10 and locking member 20 towards each other, thereby effecting pivotal movement of the latter against the spring tension of member 18 until the material which is placed between gripping members 23 and 24 is firmly grasped, at which time terminal 22 of locking member 20 has pivoted into engagement with selected notch 16 for locking members 10 and 20 together. At this time, it will be noted that spring and pivot connecting member 18 has been bent to the substantially rectilinear shape shown in FIGURE 2, against the inherent spring action of that member. The bending of spring and pivot connecting member 18 serves to retain the locking member 20 in locked position under tension. The bending action of member 18 also moves that member into retaining engagement with hanger supporting member or the like 34, in the manner illustrated in FIGURE 2. By the coaction of members 18 and 30, therefore, the device of the present invention is firmly held against accidental disengagement from, or longitudinal movement with respect to, member 34.

Opening of the device is readily effected by exerting inward pressure on locking member 20 at a point adjacent locking element 14. This causes initial arcuate movement of locking member 20 to separate from notches about pivot point A, disengaging terminal 22 from selected notch 16, following which spring and pivot connecting member 18 acts on locking member 20 to move it to the initial open position shown in FIGURE 1.

*Form of invention of FIGURES 3–5*

In the form of invention illustrated in FIGURES 3, 4 and 5, the device of the present invention is illustrated as applied to a diaper clip or like device and basically employs the same locking structure as employed in the form of invention illustrated in FIGURES 3, 4 and 5 and like parts, are accordingly identified by like, primed numbers.

In accordance with this form of the invention, base member 10' is provided with a plurality of teeth 36 of generally conical shape which are positioned on the inner face of the base member in predetermined staggered relationship. It will be noted from FIGURES 4 and 5 that when the clip is moved from open to closed position, the teeth of base member 10' and locking member 20' intermesh so that the diaper material or other objects placed therebetween are forced to assume a tortuous position, resulting in greatly increasing the gripping capability of the clip.

*Form of invention of FIGURES 6 and 7*

In FIGURES 6 and 7, there is illustrated another modified form of the present invention, as applied to a skirt or trouser hanger. In this form of the invention, the basic locking system employed is the same as illustrated in the form of invention illustrated in FIGURES 1 and 2. Accordingly, parts of the form of invention illustrated in FIGURES 6 and 7 which are similar to parts of the form of invention illustrated in FIGURES 1 and 2 are identified by like, double primed numbers. In this form of the invention, the hanger is preferably of one-piece molded construction and includes a hook 40 which issues from locking element 14". The lower terminals of base member 10" and locking member 20" issue into a pair of opposed, like skirt or trouser retaining arms 42 which are slightly bowed or arcuate longitudinally of their length to provide a firmer grasp of the object being held. The tension of the skirt or trousers is further aided by transverse serrations 44 located on the inner faces of members 42 at the terminals thereof.

Closing and opening of the skirt or trouser hanger of FIGURES 6 and 7 is accomplished in the same manner as in the form of invention illustrated in FIGURES 1 and 5. It will be noted from the drawings that when the bowed or arcuate members 42 are moved from the open position of FIGURE 6 to the closed position of FIGURE 7, force is exerted on the contiguous terminals thereof and this, coupled with the locking of the hanger causes a straightening of members 42, with resultant greater gripping engagement of the terminals thereof with the skirt or trousers.

With the device of the present invention, a simple and economical fastening and locking device is provided embodying a minimum of parts effecting a positive locking action. The selective locking arrangement afforded by the present device adapts the same for gripping engagement with materials of different thicknesses. The construction of the fastening and locking device of the present invention additionally lends itself to facile operation with one hand.

While there have been herein shown and described the presently preferred forms of the present invention, it is to be understood that such has been done for purposes of illustration only, and that various changes therein may be made within the scope of the claims hereto appended.

Having thus described my invention, what I claim is:
1. A fastening and locking device including:
   (a) a base member,
   (b) one terminal of said base member being disposed at an angle to the remainder of the base member,
   (c) said angularly disposed portion being provided with at least one locking element,
   (d) a locking member,
   (e) one terminal of said locking member being adapted for interengagement with said locking element to lock the base and locking members together,
   (f) an elongated resilient member flexible throughout its length joining said base and locking members,
   (g) means carried by the free terminals of said base and locking members for grippingly holding an object therebetween.
2. The fastening and locking devices of claim 1, wherein:
   (a) said locking element includes a notch adapted for the reception of said locking member terminal.
3. The fastening and locking device of claim 1, wherein:
   (a) said locking element includes a plurality of notches for selective engagement with said locking member.
4. The fastening and locking device of claim 1, wherein:
   (a) said means comprise inwardly and rearwardly directed members.
5. The fastening and locking device of claim 1, wherein:
   (a) said means comprises teeth extending from said base member and locking member in opposed relationship, for engagement with the object to be held.
6. The fastening and locking device of claim 1, with the addition of:
   (a) a member extending from said base member,
   (b) said member being provided with at least one recess adapted for the reception of a supporting member of a hanger-type device.
7. The fastening and locking device of claim 1, with the addition of:
   (a) a hook extending upwardly from said locking element and wherein,
   (b) said means include opposed retaining arms movable inwardly with said base member and locking member, for holding an object therebetween.
8. The fastening and locking device of claim 7, wherein:
   (a) said retaining arms are bowed longitudinally of their length,
   (b) the opposed terminals of said retaining arms being closer together than the intermediate portions thereof, for optimum gripping engagement of opposed terminals of the retaining arms with an object therebetween.
9. A fastening and locking device including:
   (a) a base member,
   (b) one terminal of said base member being bent at an angle to the remaining portion of the base member to form a locking element,
   (c) a plurality of transverse notches on the inner face of said locking element near the extremity thereof,
   (d) a locking member,
   (e) one terminal of said locking member being selectively engaged with said transverse notches to lock said base member and locking member together,
   (f) a bowed combination spring and pivot connecting member flexible throughout its length joining said base and locking members, and
   (g) gripping means carried by the free terminals of said base and locking members for holding an object placed therebetween.

10. The fastening and locking device of claim 9, wherein:
 (a) the free terminals of said base member and locking member are bent inwardly and rearwardly to provide gripping means for holding an object.

11. The fastening and locking device of claim 9, with the addition of:
 (a) a member extending inwardly of said base member proximate said combination spring and pivot connecting member,
 (b) said member being provided with a plurality of transverse arcuate recesses of different sizes adapted for selective engagement with the supporting member of a hanger-type device,
 (c) said combination spring and pivot connecting member being urged towards said member and the hanger-type device upon interengagement of said base and locking members, to prevent accidental disengagement or longitudinal movement of the device with respect to the hanger-type device.

12. The fastening and locking device of claim 9, wherein said means comprise:
 (a) staggered teeth extending from opposed faces of said base and locking members for engagement with the object to be held.

13. The fastening and locking device of claim 9, with the addition of:
 (a) a hook extending upwardly from said locking element, and wherein,
 (b) said means include opposed retaining arms bowed longitudinally of their length,
 (c) the opposed terminals of said retaining arms being closer together than the intermediate portions thereof, for optimum gripping engagement of opposed terminals of the retaining arms with an object therebetween.

14. A fastening and locking device including:
 (a) a base member,
 (b) one terminal of said base member being disposed at an angle to the remainder of the base member,
 (c) said angularly disposed portion being provided with at least one locking element,
 (d) a locking member,
 (e) one terminal of said locking member being adapted for interengagement with said locking element to lock the base and locking members thereto,
 (f) the free terminals of said base member and locking member being bent inwardly towards each other and rearwardly with respect to the main body portion of said base member and locking member, to form gripping members between which an object is held,
 (g) said gripping members being inherently flexible to permit slight movement of the gripping members in a direction to exert a stronger grip on the object being held in the event a pull is exerted on the object in a direction to remove the same from between the gripping members, and
 (h) a flexible connecting member joining said base and locking member.

15. The fastening and locking device of claim 14, wherein:
 (a) the opposed faces of said gripping members are provided with serrations to afford a better purchase on the object being held therebetween.

References Cited

UNITED STATES PATENTS

| | | | |
|---|---|---|---|
| 1,291,242 | 1/1919 | Sutherland | 223—96 |
| 2,553,710 | 5/1951 | Incampo | 24—252 XR |
| 3,058,186 | 10/1962 | Fanning | 24—137 |
| 3,073,491 | 1/1963 | Brooke | 223—96 |
| 3,246,376 | 4/1966 | Vazquez | 24—160 |

FOREIGN PATENTS

| | | |
|---|---|---|
| 501,760 | 2/1920 | France. |
| 417,123 | 8/1925 | Germany. |
| 5,584 | 1/1890 | Great Britain. |
| 24,168 | 1/1912 | Great Britain. |
| 651,186 | 3/1951 | Great Britain. |

DONALD A. GRIFFIN, *Primary Examiner.*